Nov. 23, 1954  N. W. ROOP  2,695,115

FOOD CONTAINER

Filed April 2, 1953

INVENTOR
Nathan W. Roop
BY William S. Rambo
ATTORNEY

United States Patent Office 2,695,115
Patented Nov. 23, 1954

2,695,115

FOOD CONTAINER

Nathan W. Roop, Columbus, Ohio, assignor to Columbus Plastic Products, Inc., Columbus, Ohio, a corporation of Ohio Application April 2, 1953, Serial No. 346,401

1 Claim. (Cl. 220—42)

This invention relates to improvements in that class of containers or receptacles which are composed of molded synthetic resins and which comprise open-topped bodies of relatively rigid composition, and utilized in association with tight-fitting closures adapted for removable application to said bodies to close the open tops thereof, the said closures being formed from plastic materials of a softer and more flexible character than those composing the container bodies.

Containers of this character are, among other uses, quite commonly employed in the retention and storage of foodstuffs in refrigerators and other low-temperature areas. Usually, such containers are brought, shipped and stored in sets, so that when not in active use the bodies of a plurality of containers may be stacked one within another, in a partially telescoped or interfitting manner, to minimize storage space or package volume. Usually, the molded bodies of such containers are of a square, seamless form in horizontal cross section, having rounded corners and inwardly and downwardly tapering side walls which merge into horizontal bottom walls. The side wall taper of such bodies is normally such as to provide for nesting of a plurality thereof in vertical order. Such nesting, however, often results in an upwardly disposed container becoming tightly wedged in binding frictional contact with the inner wall surfaces of a receiving lower container. Such wedging is undesirable in that it makes the operation of separating the containers difficult and laborious to perform and is also apt to result in container breakage.

Accordingly, it is one of the principal objects of the present invention to provide a plastic food container of the character indicated wherein the outer wall surfaces of square tapering bodies thereof are formed with molded projections, the latter forming laterally offset horizontal shoulders so arranged as to engage the upper edges of a complemental lower container body to limit positively the extent of telescoping movement of the upper into the lower body, whereby to enable container bodies so nested or telescoped to be readily separated whenever desired and without sticking or binding on the part thereof.

Another object is to provide molded food containers of the type defined wherein the horizontal bottom-forming wall of each body is provided with a plurality of integral depending foot-forming ribs which, when the containers are stacked vertically one upon another, and with their removable closures in operative positions closing the open tops or mouths of the associated container bodies, are adapted to be disposed in registering but laterally offset relation with cooperative upstanding ribs or projections integrally formed with the container closures, the relative order of the ribs of such vertically stacked containers being such as to maintain the vertical relation thereof by preventing an upper container accidentally from shifting sideways with respect to a lower supporting container and toppling over.

A further object is to provide an improved flexible cover for the open top of a container having a box-like body section.

With the above and other objects and advantages in view, the invention consists in the novel features of construction, combinations of elements and arrangement of parts present in the body and closure sections of my improved container, and all equivalents thereof.

In the accompanying drawing, in which similar characters of reference denote like and corresponding parts in all the views thereof:

Fig. 1 is a top plan view of a food container formed in accordance with the present invention;

Fig. 2 is a vertical sectional view taken on the plane disclosed by the line 2—2 of Fig. 1. In this figure a pair of containers, with the closures thereof in applied position, have been illustrated in a vertically arranged superposed order, whereby to illustrate the interfitting body and closure ribs utilized by the present invention in preventing accidental lateral shifting of complete vertically stacked containers;

Figure 1:
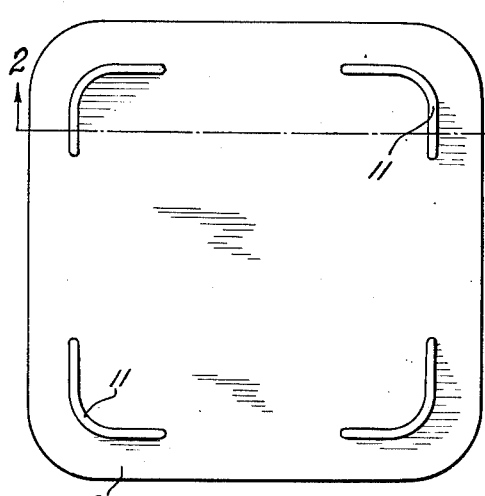

Referring more particularly to the single embodiment of the invention illustrated in detail in the drawings, my improved food-receiving container or receptacle comprises a body section shown at 1 and a top, cover or closure section indicated at 2, both sections being formed from molded plastic materials.

The body section, while capable of being produced from many different moldable plastics is preferably formed from polystyrene. Usually, polystyrene mixed with minor percentages of natural or synthetic rubber comprises a preferred body-forming material because of its higher impact-sustaining strength and elongation factor at normal and freezing temperatures than general purpose polystyrene. Such plastic materials are adapted when in a heated and flowable state to be injected into the molding cavities of a pressure-injection type of molding press, not shown, and therein retained until the desired final form or shape of the body section is secured. When removed from the press the walls of the body section are relatively stiff and rigid and highly resist fracture or breakage incident to normal handling thereof.

While the body section is formed to possess rigidity in its wall composition, the closure or cover section 2 while of a pressure molded plastic composition, possesses a greater degree of pliability, flexibility and softness than the finished body section. In this regard, I preferably employ polyethylene as a suitable synthetic resin for use in forming the top or cover section 2. A closure section of polyethylene is strong, flexible in limited degree and tough, resists fracture or breakage, tends to cling to associated surfaces of the body section in an effective container-closing and sealing manner, retains its position of closure even when subjected to unbalanced internal and external gas pressures, and may be readily kept in a clean and sanitary condition. The plastic materials specified are also chemically inert to the composition of virtually all food materials received in said containers. Because of their lightweight and resistance to fracture and breakage, the materials specified are preferred over glass and other molded ceramic materials.

Figure 4:
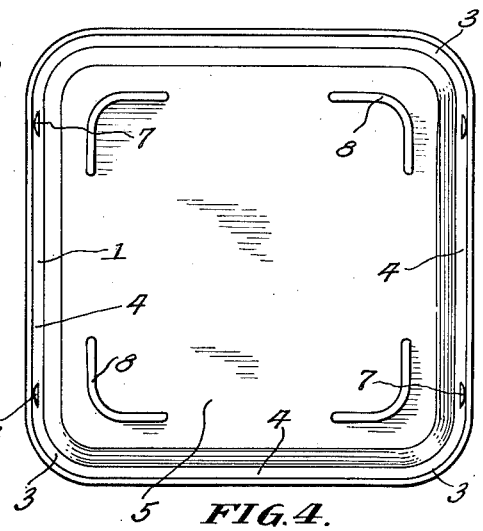
Fig. 4 is a bottom plan view of the body section of my improved container.
Figure 3:
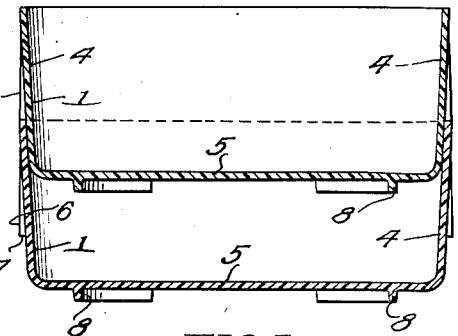
Fig. 3 is also a vertical sectional view, showing a pair of body sections with their closures removed and arranged in nested order and developing the function of the side wall projections of said body sections in limiting insertive movement of one body section into another.
Figure 5:
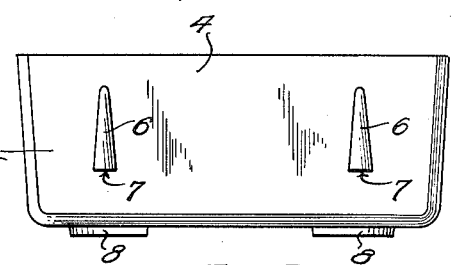
Fig. 5 is a side elevational view of the body section, disclosing the inward and downward taper of the side walls and also the movement-limiting ribs and projections formed on the bottom and side walls, respectively, thereof.
Figure 6:
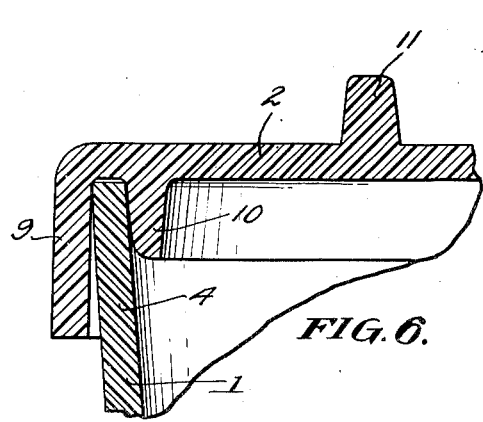
Fig. 6 is an enlarged detail sectional view disclosing the construction employed in effecting the interfitting relationship between the body and closure sections of my improved container.

The body section 1 is formed so that in horizontal section the same is substantially square throughout its entire height, the corners 3 thereof being rounded and the side walls 4 thereof being inwardly and downwardly tapered toward the flat horizontal bottom wall 5. The taper of the walls 4 is such as to provide for the nesting of a plurality of the body sections, as shown in Fig. 3, whereby to provide compactness and space saving in the storage and shipment of the containers. By reference to Figs. 3 and 4, it will be noted that undue wedging of the interfitting or nested body sections is prevented by providing the outer surfaces of opposing walls 4 with integral molded projections 6 which are so formed as to present at their lower ends laterally offset horizontal shoulders 7, the latter extending outwardly from the outer surfaces of the walls 4. As illustrated, the shoulders 7 are adapted to rest upon the upper edges of a next adjacent lower body section, whereby to limit positively the degree or extent of insertion of one body section into another, thereby preventing undue frictional contact between the contiguous walls of interfitting body sections and enabling the sections to be readily separated when desired. Also, the bottom wall 5 of each body section is formed with a plurality of integral, depending foot-forming ribs 8, the purpose of which will be presently defined.

Figure 2:
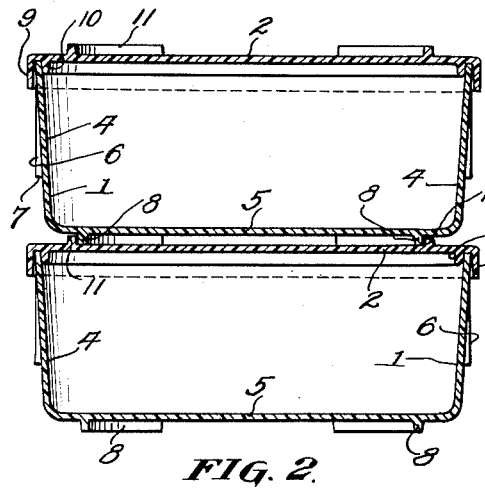

The relatively flexible cover section 2 is molded from polyethylene, or the like, to possess the square or rectangular cross-sectional configuration of the body section. When applied, as shown in Fig. 2, the cover section extends horizontally across the open top or mouth of the body section to enclose and protect food or other substances placed in the body section. The cover section includes a depending relatively wide outer flange 9 and a narrower depending and transversely spaced inner flange 10. The latter is formed and arranged so that it hugs or engages closely the upper and inner surfaces of the body walls 4 while the increased width or depth of the outer flange 9 provides for the spacing of its lower edge portion from the adjoining outer surfaces of the walls 4 to enable the fingers of a user to readily grip the flange 9 and apply lifting or raising forces thereto, whereby to remove an applied cover section from an associated body section.

Each cover or closure section is formed to include integral upstanding positioning ribs 11 which are adapted to cooperate with the ribs or projections 8 of the body sections to prevent undesired lateral shifting of the containers when the latter are arranged in vertically superposed order, as in Fig. 2. In this arrangement the ribs 8 of the body sections are disposed so that they lie immediately within the confines of the raised ribs 11 of the closure sections, thereby providing abutments of an interengaging character between a pair of containers arranged relatively in vertical order with an upper container supported on a lower container.

In view of the foregoing, it will be noted that the present invention provides a container or receptacle for receiving and storing food in refrigerators under protected conditions. By being formed from molded plastic materials the containers do not readily break or crack if dropped or bumped against unyielding surfaces. Due to the flexibility of the cover sections, the same are adapted to be drawn tautly over the open tops of the body sections. It will be observed that the cover sections when applied are, with the exception of their depending flanges, disposed in a true horizontal plane, and are devoid of centrally depressed regions, thereby enabling the cover sections to be placed under tension and stretched over the upper edges of associated body sections in maintaining the same in sealing engagement therewith. The construction is essentially simple and may be produced readily at a relatively low cost with the use of standard injection-type presses used in the forming of molded articles of plastic composition. The containers, it will be understood, are sold in sets of three or four units, which vary in volumetric capacity by possessing different height dimensions, but without varying their horizontal dimensions. This arrangement enables the containers to receive various kinds of foods, but admits of the nesting and stacking of the container sections as above set forth. The flexible and distortable composition of the cover sections enables the latter to possess sheet-like bodies of the cover sections when applied lie in a single horizontal plane in a stretched or taut condition. The tension forces present in the cover section are transmitted to the walls of the body section through the base portion of the flanges 9 and 10. In this construction the utilization of cover sections having depressed central regions is avoided and a stronger and more readily manipulable cover section produced.

I claim:

A frozen food receptacle of molded plastic composition comprising an open top receptacle body of generally rectangular cross section having inwardly and downwardly tapering side walls defining along their upper edges an open mouth rim and a generally flat rectangular bottom wall, said bottom wall having on its outer surface and inwardly from each of the corners thereof a plurality of integral, depending, substantially right angularly disposed feet arranged to support said body in vertically spaced relation to a supporting surface upon which said feet are positioned; and a closure for said receptacle body consisting of a substantially flat rectangular top wall formed along the marginal edges thereof with integral and relatively spaced depending flanges defining a continuous rectangular channel to receive the rim of said receptacle body, said closure being formed to include upon the upper surface thereof a plurality of integral, upstanding, and right angularly disposed positioning ribs, said positioning ribs being disposed on said closure in inwardly spaced relation to each of the corner portions of said closure and being relatively spaced to receive therebetween the depending feet of a receptacle body positioned in stacked relation upon said closure, whereby to prevent accidental lateral shifting of said last-named body when stacked upon said closure.

References Cited in the file of this patent

UNITED STATES PATENTS

| Number | Name | Date |
| --- | --- | --- |
| 1,016,390 | Beadle | Feb. 6, 1912 |
| 2,487,400 | Tupper | Nov. 8, 1949 |
| 2,564,834 | Devine et al. | Aug. 21, 1951 |
| 2,606,586 | Hill | Aug. 12, 1952 |
| 2,630,237 | Rosenlof | Mar. 3, 1953 |
| 2,638,261 | Poole | May 12, 1953 |